(12) United States Patent
Totani

(10) Patent No.: US 8,882,303 B2
(45) Date of Patent: Nov. 11, 2014

(54) LED LAMP

(71) Applicant: Beat-Sonic Co., Ltd., Nisshin (JP)

(72) Inventor: Tsutomu Totani, Nisshin (JP)

(73) Assignee: Beat-Sonic Co., Ltd., Nisshin-shi, Aichi (JP)

( * ) Notice: Subject to any disclaimer, the term of this patent is extended or adjusted under 35 U.S.C. 154(b) by 0 days.

(21) Appl. No.: 14/045,972

(22) Filed: Oct. 4, 2013

(65) Prior Publication Data

US 2014/0112000 A1 Apr. 24, 2014

(30) Foreign Application Priority Data

Oct. 23, 2012 (JP) ................................. 2012-233386

(51) Int. Cl.
| | |
|---|---|
| F21V 29/00 | (2006.01) |
| F21V 17/00 | (2006.01) |
| F21V 17/10 | (2006.01) |
| F21V 17/12 | (2006.01) |
| F21K 99/00 | (2010.01) |
| F21V 17/14 | (2006.01) |
| F21V 25/00 | (2006.01) |
| F21V 3/04 | (2006.01) |
| F21Y 101/02 | (2006.01) |

(52) U.S. Cl.
CPC ............. *F21V 17/002* (2013.01); *F21V 17/104* (2013.01); *F21V 17/12* (2013.01); *F21V 29/20* (2013.01); *F21V 29/2206* (2013.01); *F21K 9/1355* (2013.01); *F21K 9/52* (2013.01); *F21V 17/14* (2013.01); *F21V 25/00* (2013.01); *F21V 3/0418* (2013.01); *F21V 3/0436* (2013.01); *F21Y 2101/02* (2013.01)
USPC ............................... 362/294; 362/235; 313/46

(58) Field of Classification Search
USPC ....................................... 362/294, 235; 313/46
See application file for complete search history.

(56) References Cited

U.S. PATENT DOCUMENTS

| | | | |
|---|---|---|---|
| 2010/0315823 A1* | 12/2010 | Lin et al. ........................ | 362/368 |
| 2012/0187818 A1* | 7/2012 | Chuang ........................... | 313/46 |
| 2012/0281400 A1* | 11/2012 | Ou et al. ........................ | 362/235 |
| 2013/0058098 A1* | 3/2013 | Kim et al. ...................... | 362/294 |
| 2013/0257259 A1* | 10/2013 | Totani ............................. | 313/46 |
| 2013/0308319 A1* | 11/2013 | Zhang et al. ............. | 362/311.01 |
| 2014/0021849 A1* | 1/2014 | Yu et al. .......................... | 313/36 |
| 2014/0043816 A1* | 2/2014 | Huang ..................... | 362/249.02 |

FOREIGN PATENT DOCUMENTS

| | | |
|---|---|---|
| JP | 2003-068119 A | 3/2003 |
| JP | 2006-127813 A | 5/2006 |
| JP | 2008-098086 A | 4/2008 |
| JP | 2011-034969 A | 2/2011 |

(Continued)

*Primary Examiner* — Ali Alavi
(74) *Attorney, Agent, or Firm* — Muncy, Geissler, Olds & Lowe, P.C.

(57) ABSTRACT

An LED lamp includes a heat dissipator, a module substrate fixed to one end of the dissipator and mounted with an LED chip, a cap mounted via an insulator on the other end of the dissipator, a lighting circuit disposed in the dissipator and/or the cap, a glove having an open end attached to the one end of the dissipator so as to cover the module substrate, an intermediate ring including an engaging portion formed on its one end, and an engaged portion formed on the one end of the dissipator so as to be detachably engageable with the engaging portion. The other end of the ring is bonded with the open end of the glove to be fixed to the open end of the glove. The engaging portion fixed to the glove engages the engaged portion so that the glove is detachably attached to the dissipator.

9 Claims, 11 Drawing Sheets

(56) References Cited

FOREIGN PATENT DOCUMENTS

| JP | 2011-070972 A | 4/2011 |
| JP | 2011-082132 A | 4/2011 |
| JP | 2011-090828 A | 5/2011 |
| JP | 2011-091033 A | 5/2011 |
| JP | 2012-018885 A | 1/2012 |
| JP | 2012-064330 A | 3/2012 |

* cited by examiner

LED LAMP

CROSS-REFERENCE TO RELATED APPLICATIONS

This application is based upon and claims the benefit of priority from the prior Japanese Patent Application No. 2012-233386 filed on Oct. 23, 2012, the entire contents of which are incorporated herein by reference.

BACKGROUND

1. Technical Field

The present disclosure relates to an LED lamp incorporating an LED chip serving as a light source.

2. Related Art

Demand for LED lamps or LED light bulbs has recently been increasing as substitute for incandescent lamps having higher electrical power consumption. This type of LED lamp is disclosed by Japanese Patent Application Publication Nos. JP-A-2011-70972, JP-A-2011-82132, JP-A-2011-90828 and JP-A-2011-91033, for example. As disclosed, the LED lamp includes a module substrate on which an LED chip is mounted and which is fixed to a first end of a heat dissipator. The LED lamp further includes a cap mounted to a second end side of the heat dissipator with an insulator being interposed therebetween. A lighting circuit supplying electric power to the LED chip is disposed in the heat dissipator and/or the cap. The lighting circuit and the cap are electrically connected to each other. The LED lamp further includes a glove which is made of a translucent material and has an open end attached to the first end of the heat dissipator so that the module substrate is covered with the glove.

The LED lamp including the LED chip serving as a light source generally has an advantage that the LED lamp has a far longer service life than an incandescent lamp. However, since the glove of the LED lamp is made of a thin translucent material such as glass or synthetic resin, the glove is vulnerable to shock and fragile. Therefore, there is a case where the glove is broken before the service life of the LED lamp is exhausted with the result that the LED lamp cannot be used. Accordingly, the service life of the LED lamp can be improved if the broken glove can easily be replaced by a new one.

Furthermore, the use application of the LED lamp as lighting equipment can be expanded if the glove of the LED lamp can easily be replaced by another glove differing in design, color or the like. Still furthermore, since the LED chip is one type of semiconductor, the LED chip is vulnerable to surge overvoltage occurring in lightning strike. Even in a case where the LED chip is broken by the surge overvoltage occurring in lightning strike, the service life of the LED lamp can be improved by replacing the module substrate by a new one if the glove can easily be detached from the heat dissipator.

SUMMARY

Therefore, an object of the disclosure is to provide an LED lamp in which the glove can easily be replaced.

The present disclosure provides an LED lamp comprising a heat dissipator having two ends, a module substrate which is fixed to one end of the heat dissipator and mounted with an LED chip, a cap mounted via an insulator on the other end of the heat dissipator, a lighting circuit which is disposed in the heat dissipator and/or the cap to supply electric power to the LED chip, the lighting circuit being electrically connected to the cap, a glove made of a translucent material and having an open end which is attached to said one end of the heat dissipator so as to cover the module substrate, an intermediate ring having two ends and including an engaging portion formed on one end thereof, and an engaged portion which is formed on the one end of the heat dissipator so as to be detachably engageable with the engaging portion. In the LED lamp, the other end of the intermediate ring is bonded with the open end of the glove thereby to be fixed to the open end of the glove. The engaging portion of the intermediate ring fixed to the glove engages the engaged portion of said one end of the heat dissipator so that the glove is detachably attached to the heat dissipator.

According to the above-described construction, the glove is detachably attached to the heat dissipator. Accordingly, even when the glove has been broken, the broken glove can be replaced by a new one, with the result that the service life of the LED lamp can be improved.

Furthermore, the glove of the LED lamp is replaceable by another glove having a different design, color or the like, with the result that the usage of the LED lamp as a lighting device can be expanded.

Still furthermore, even in a case where the LED chip is broken by lightning strike or the like, the module substrate is replaced by a new one after the glove has been detached, whereupon the service life of the LED lamp can be improved.

In one embodiment, the engaging portion is a screw thread or a thread groove formed on an outer or inner periphery of the intermediate ring. The engaged portion is a thread groove or a screw thread formed on said one end of the heat dissipator. The screw thread or the thread groove of the intermediate ring threadingly engages the thread groove or the screw thread of the heat dissipator so that the glove is detachably attached to the heat dissipator. According to the above-described construction, the heat dissipator is formed with the thread groove or the screw thread and the open end of the glove is formed with the screw thread or the thread groove. Consequently, the glove can detachably be attached to the heat dissipator by a simple operation of threadingly engaging the thread groove or the screw thread of the intermediate ring with the thread screw or the heat dissipator.

In another embodiment, the LED lamp further comprises a cylindrical cover made of a synthetic resin and covering the outer periphery of the heat dissipator. In the LED lamp, the cylindrical cover has an open end formed with an inwardly protruding flange, and the flange is held between the intermediate ring threadingly engaging the one end of the heat dissipator and the one end surface of the heat dissipator, whereby the cylindrical cover is attached to the heat dissipator. According to this construction, the cylindrical cover can be attached to the heat dissipator using the intermediate ring. Consequently, the user can be prevented from getting into touch with the heat dissipator which is hot during lighting.

In further another embodiment, the intermediate ring has a screw hole into which a setscrew is screwed, and the setscrew has a distal end pressed against an outer periphery of the one end of the heat dissipator. According to this construction, the intermediate ring can strongly be fixed to the heat dissipator by the setscrew.

In further another embodiment, the one end of the intermediate ring is formed with a through hole. The engaging portion is a screw inserted through the hole of the intermediate ring. The engaged portion is a screw hole formed in an outer periphery of said one end of the heat dissipator. The screw inserted through the hole of the intermediate ring is further threadingly engaged with the screw hole of the heat dissipator, whereby the glove is detachably attached to the heat dissipator. According to this construction, the glove can be attached to the heat dissipator by a simple operation of threadingly engaging the screws inserted through the holes of the intermediate ring, into the screw holes, respectively.

In further another embodiment, the engaging portion is a plurality of engaging protrusions which is formed on the outer periphery of the intermediate ring so as to protrude outward. The engaged portion is a plurality of engaged recesses including pairs of vertical notches open at said one end of the heat dissipator and horizontal notches extending from inner ends of the vertical notches, respectively. The engaging protrusions are inserted into the vertical notches and thereafter, the glove is turned relative to the heat dissipator so that the engaging protrusions engage the horizontal notches, whereby the glove is detachably attached to the heat dissipator, respectively. According to this construction, the glove can be attached to the heat dissipator by a simple operation of inserting the engaging protrusions into the vertical notches and then turning the glove relative to the heat dissipator so that the engaging protrusions engage the horizontal notches, respectively.

In further another embodiment, the engaging portion is a plurality of engaging recesses including pairs of vertical notches open at an end of the intermediate ring and horizontal notches extending from inner ends of the vertical notches, respectively. The engaged portion is a plurality of engaged protrusions which is formed on said one end outer periphery of the heat dissipator so as to protrude outward. The engaged protrusions are inserted into the vertical notches and thereafter, the glove is turned relative to the heat dissipator so that the engaged protrusions are engaged with the horizontal notches, whereby the glove is detachably attached to the heat dissipator, respectively. According to this construction, the glove can be attached to the heat dissipator by a simple operation of inserting the engaging protrusions into the vertical notches and then turning the glove relative to the heat dissipator so that the engaging protrusions engage the horizontal notches, respectively.

In further another embodiment, the engaging portion includes a plurality of through holes formed through the end of the intermediate ring and screws screwed through the holes respectively and ring protrusions which are formed on a middle part of the intermediate ring so as to protrude inward. The engaged portion includes a flange formed on the outer periphery of the one end of the heat dissipator. The flange is held between the ring protrusions and distal ends of the screws protruding from the holes of the intermediate ring, whereby the globe is detachably attached to the heat dissipator. According to this construction, the glove can be attached to the heat dissipator by a simple operation of causing the distal ends of the screws to protrude from the screw holes, thereby holding the flange between the ring protrusions and distal ends of the screws protruding.

The disclosure also provides an LED lamp comprising a heat dissipator having two ends, a module substrate which is fixed to one end of the heat dissipator and mounted with an LED chip, a cap mounted via an insulator on the other end of the heat dissipator, a lighting circuit which is disposed in the heat dissipator and/or the cap to supply electric power to the LED chip, the lighting circuit being electrically connected to the cap, a glove made of a translucent material and having an open end which is attached to said one end of the heat dissipator so as to cover the module substrate, an intermediate ring having two ends and including ring protrusions formed on an outer periphery of one end thereof, and a coupling ring having two ends releasably connectable to each other and having an inner periphery formed with a ring groove. In the LED lamp, the heat dissipator has a flange formed on an outer periphery of the one end thereof. The other end of the intermediate ring is bonded to the open end of the glove thereby to be fixed to the open end of the glove. The flange of the heat dissipator and the ring protrusions of the intermediate ring are overlapped. The coupling ring is wound on the overlapped flange and ring protrusions so that the flange and the ring protrusions are engaged in the ring groove. The ends of the coupling ring are connected together, whereby the glove is detachably attached to the heat dissipator.

According to the above-described construction, the glove can be attached to the heat dissipator by a simple operation of winding a coupling ring on the overlapped flange and ring protrusions so that the flange and the ring protrusions are engaged in the ring groove and coupling the ends of the coupling rings.

DETAILED DESCRIPTION

Figure 1:
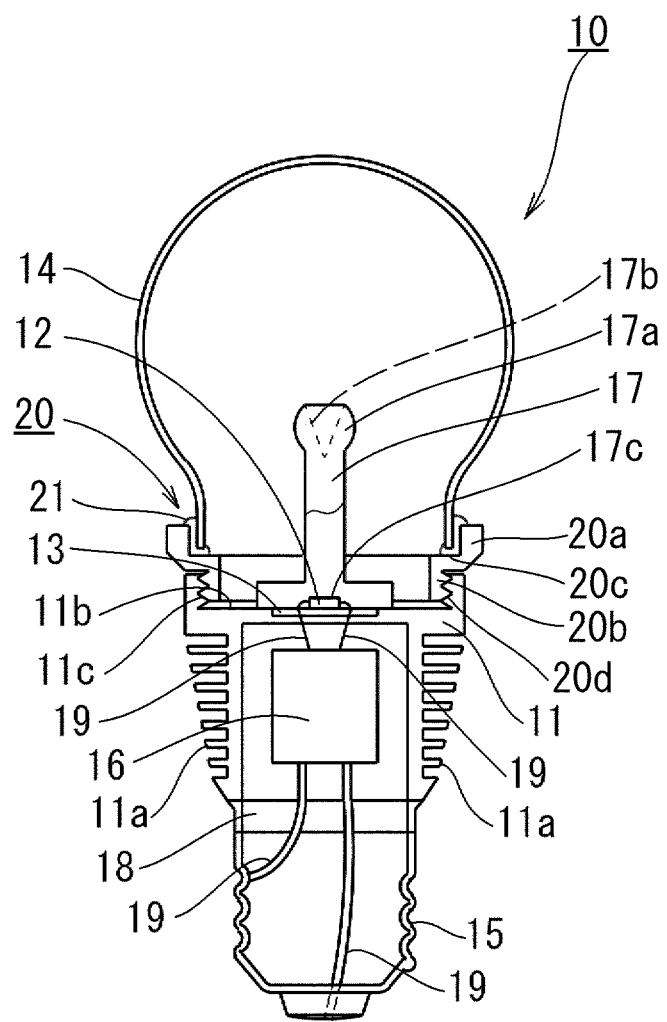
FIG. 1 is a sectional view of an LED lamp of a first embodiment.

Several embodiments will be described with reference to the accompanying drawings. Referring to FIG. 1, an LED lamp 10 of a first embodiment is shown. The LED lamp 10 includes a heat dissipator 11 made of a metal, such as aluminum, an LED chip 12, a module substrate 13 on which an LED chip 12 is mounted, a translucent dome-shaped glove 14 made of glass or resin, a cap 15, a lighting circuit 16 which supplies electric power to the LED chip 12, a light guide member 17 and an intermediate ring 20.

The heat dissipator 11 is formed into the shape of a generally inverted truncated cone and has an outer periphery formed with a number of fins 11a which increase a surface area in order to enhance a heat radiation effect. The module substrate 13 is fixed to an upper end surface of the heat dissipator 11. The cap 15 is attached via a cylindrical insulator 18 to a lower open end of the heat dissipator 11, whereby an interior of the heat dissipator 11 communicates with an interior of the cap 15. The lighting circuit 16 is disposed in the interiors of the heat dissipator 11 and the cap 15. The module substrate 13 and the lighting circuit 16 are electrically connected together by a lead wire 19. The lighting circuit 16 and the cap 15 are also connected together by another lead wire 19.

The intermediate ring 20 includes an upper larger diameter portion 20a, a lower smaller diameter portion 20b, a flat surface 20c located between the larger and smaller diameter portions 20a and 20b. The smaller diameter portion 20b has an outer periphery formed with a screw thread or a thread groove 20d. On the other hand, the heat dissipator 11 has an upper end 11b having an inner periphery formed with a thread groove or a screw thread 11c. The glove 14 has an open end fitted in the larger diameter portion 20a of the intermediate ring 20 thereby to be fixed to the intermediate ring 20 by a bonding agent 21. The screw thread or thread groove 20d of the intermediate ring 20 to which the glove 14 is fixed is threadingly engaged with the thread groove or the screw thread 11c of the heat dissipator 11, whereby the glove 14 is detachably attached to the heat dissipator 11 so as to cover the module substrate 13.

The light guide member 17 is fixed to the module substrate 13 further fixed to the upper end of the heat dissipator 11, so as to stand from the module substrate 13. The light guide member 17 is a plastic molding and has a distal end having a reflecting portion 17a. The reflecting portion 17a has a square pyramidal reflecting surface 17b formed on an inner surface thereof. On the other hand, the light guide member 17 has a proximal end formed with a recess 17c. The light guide member 17 is attached to the module substrate 13 so that the LED chip 12 is covered with the recess 17c. Light emitted from the LED chip 12 disposed opposite the recess 17c enters the light guide member 17 from the recess 17c to be reflected on the reflecting surface 17b, thereby being diffused around the reflecting portion 17a.

The LED lamp 10 constructed as described above will works as follows. The intermediate ring 20 is formed with the screw thread or the thread groove 20d, and the heat dissipator 11 is formed with the thread groove or the screw thread 11c. Accordingly, the glove 14 can easily be attached to the heat dissipator 11 by a simple operation of threadingly engaging the screw thread or the thread groove 20d of the intermediate ring 20 with the thread groove or the screw thread of the heat dissipator 11. Consequently, even when the glove 14 has been broken, the glove 14 is replaced by a new one, with the result that the service life of the LED lamp 10 can be improved.

Furthermore, the glove 14 of the LED lamp 10 is replaceable by another glove having a different design and/or color, with the result that the usage of the LED lamp 10 as a lighting device can be expanded.

Still furthermore, even in a case where the LED chip is broken by lightning strike or the like, the module substrate is replaced by a new one after the glove has been detached, whereupon the service life of the LED lamp 10 can be improved.

Particularly in the LED lamp 10 of the embodiment, the intermediate ring 20 is fixed to the glove 14 by the bonding agent 21, and the glove 14 is detachably attached via the intermediate ring 20 to the heat dissipator 11. Since the open end of the glove 14 is thin and easy to break, the open end of the glove 14 is formed with neither screw thread nor thread groove. Thus, the glove 14 can be attached to the heat dissipator 11 without directly forming on or in the open end of the glove 14 the screw thread or the thread groove 20d to be threadingly engaged with the thread groove or the screw thread 11c.

Figure 2:
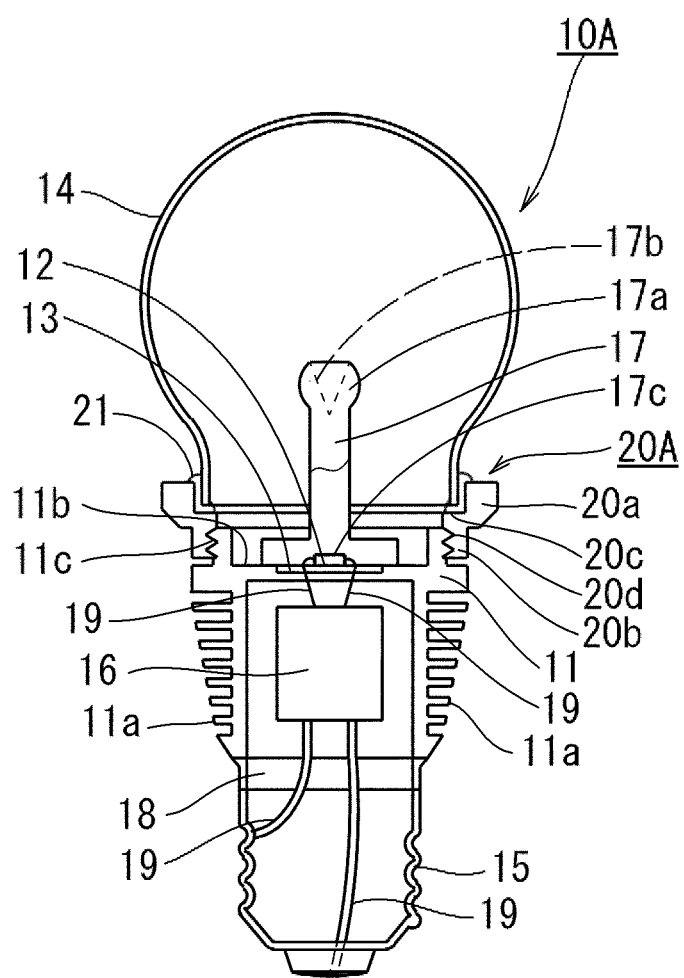
FIG. 2 is a sectional view of an LED lamp of a second embodiment.

FIG. 2 illustrates an LED lamp 10A of a second embodiment. In the LED lamp 10 of the first embodiment, the upper end 11b of the heat dissipator 11 has the inner periphery formed with the thread groove or the screw thread 11c. The lower smaller diameter portion 20b of the intermediate ring 20 has the outer periphery formed with the screw thread or the thread groove 20d. In the second embodiment, however, the upper end 11b of the heat dissipator 11 has an outer periphery formed with the thread groove or the screw thread 11c, and the lower smaller diameter portion 20b of the intermediate ring 20A has an inner periphery formed with the screw thread or the thread groove 20d. In this construction, too, the glove 14 can detachably be attached to the heat dissipator 11.

The other structure of the LED lamp 10A of the second embodiment is identical with that of the LED lamp 10 of the first embodiment. Identical or similar parts in the second embodiment are labeled by the same reference symbols as those in the first embodiment and the description of these parts will be eliminated.

Figure 3:
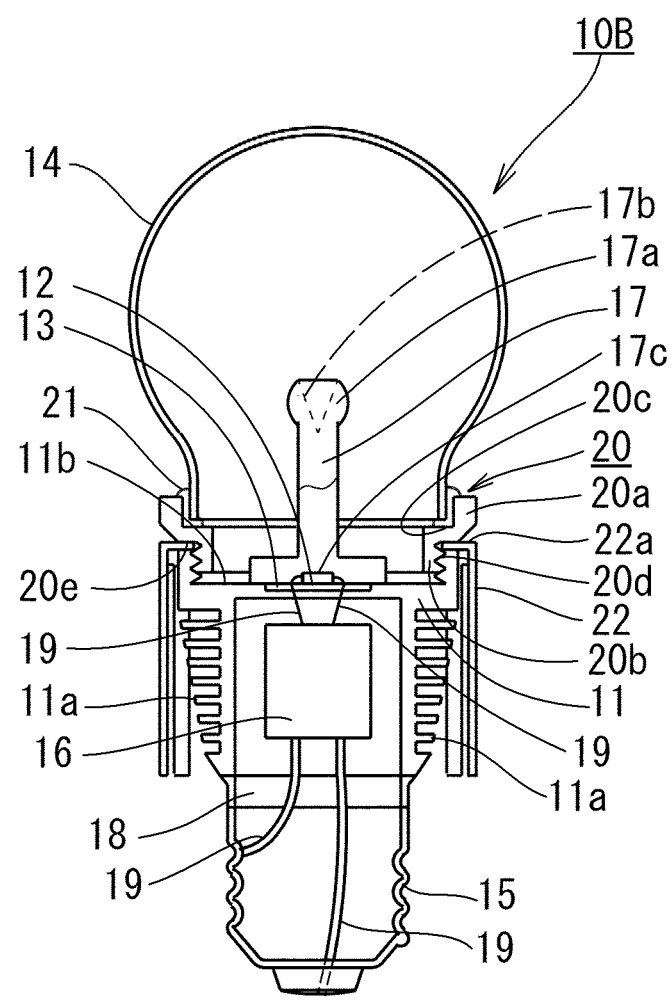
FIG. 3 is a sectional view of an LED lamp of a third embodiment.
Figure 4:
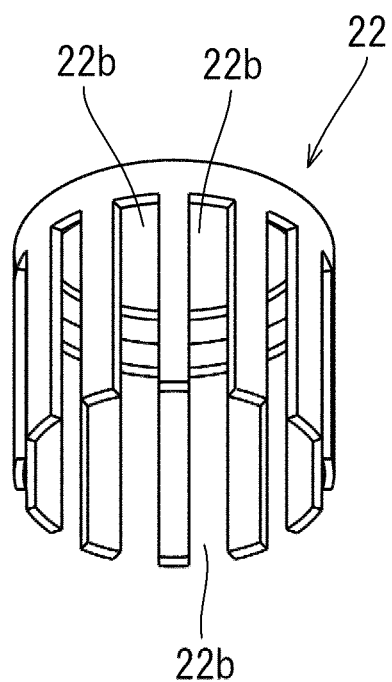
FIG. 4 is a perspective view of a cylindrical cover of the LED lamp of the third embodiment.

FIG. 3 illustrates an LED lamp 10B of a third embodiment. The LED lamp 10B includes a cylindrical cover 22 made of a synthetic resin and covering the outer periphery of the heat dissipator 11. The cylindrical cover 22 has an open end formed with a flange 22a protruding inward. The cylindrical cover 22 has an outer periphery formed with a plurality of notches 22b arranged at regular intervals.

The cylindrical cover 22 is attached to the heat dissipator 11 while the flange 22a is held between an outer flat portion 20e of the intermediate ring 20 threadingly engaged with the end of heat dissipator 11 and the end surface of the heat dissipator 11.

The other structure of the LED lamp 10B of the third embodiment is identical with that of the LED lamp 10 of the first embodiment. Identical or similar parts in the third embodiment are labeled by the same reference symbols as those in the first embodiment and the description of these parts will be eliminated.

According to the LED lamp 10B of the third embodiment, the cylindrical cover 22 can be attached to the heat dissipator 11 using the intermediate ring 20. Consequently, the user can be prevented from touching the heat dissipator 11 hot during lighting.

Furthermore, since the cylindrical cover 22 is formed with the notches 22b, hot air subjected to heat generated by the heat dissipator 11 can be prevented from being trapped inside the cylindrical cover 22. This can prevent reduction in the radiation performance of the heat dissipator 11.

Figure 5:
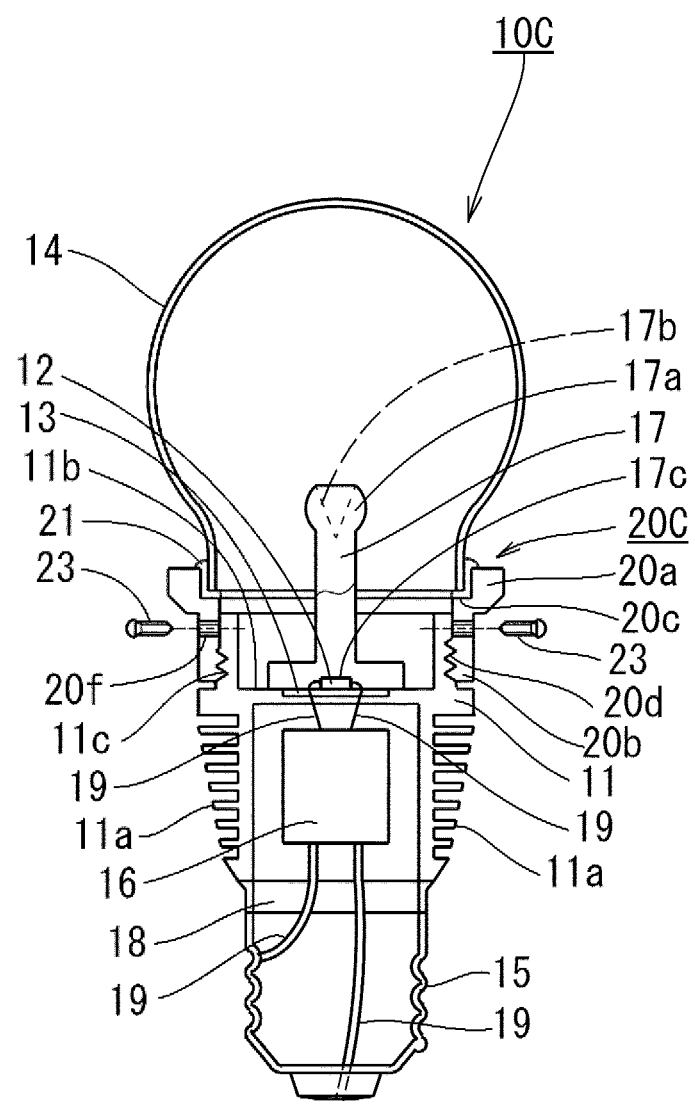
FIG. 5 is a sectional view of an LED lamp of a fourth embodiment.

FIG. 5 illustrates an LED lamp 10C of a fourth embodiment. The intermediate ring 20C of the LED lamp 10C has a middle part formed with screw holes 20f. In the LED lamp 10C, the intermediate ring 20C fixed to the glove 14 is threadingly engaged with the an outer periphery of the end of the heat dissipator 11 and thereafter, setscrews 23 are screwed into the screw holes 20f until distal ends of the setscrews 23 presses the outer periphery of the end of the heat dissipator 11.

The other structure of the LED lamp 10C of the fourth embodiment is identical with that of the LED lamp 10A of the second embodiment. Identical or similar parts in the fourth embodiment are labeled by the same reference symbols as those in the second embodiment and the description of these parts will be eliminated.

According to the LED lamp 10C of the fourth embodiment, the intermediate ring 20C can strongly be fixed to the heat dissipator 11 by the setscrews 23.

Figure 6:
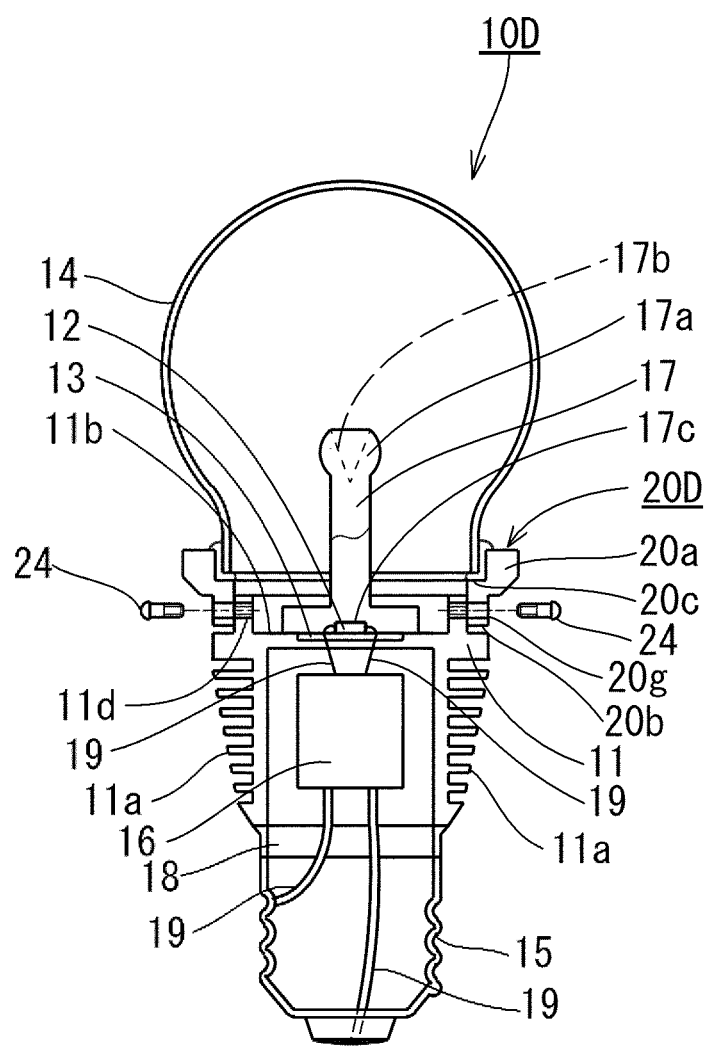
FIG. 6 is a sectional view of an LED lamp of a fifth embodiment.
Figure 7:
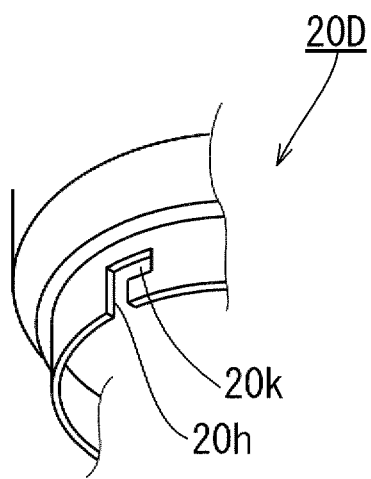
FIG. 7 is a perspective view of another intermediate ring differing from that employed in the LED lamp as shown in FIG. 6.

FIG. 6 illustrates an LED lamp 10D of a fifth embodiment. The intermediate ring 20D has through holes 20g formed in the end thereof. The end of the heat dissipator 11 has screw holes 11d formed in the outer periphery thereof. In the LED lamp 10D, small screws 24 are inserted through the respective holes 20g of the intermediate ring 20D to which the glove 14 is fixed. The screws 24 are then screwed into the respective screw holes 11d, whereby the glove 14 is detachably attached to the heat dissipator 11.

According to the LED lamp 10D of the fifth embodiment, the glove 14 can detachably be attached to the heat dissipator 11 by a simple operation of screwing the screws 24 through the holes 20g of the intermediate ring 20D and further screwing the screws 24 into screw holes 11d of the heat dissipator 11, respectively.

The other structure of the LED lamp 10D of the fifth embodiment is identical with that of the LED lamp 10 of the first embodiment. Identical or similar parts in the fifth embodiment are labeled by the same reference symbols as those in the first embodiment and the description of these parts will be eliminated.

Although the intermediate ring 20D of the LED lamp 10D is formed with the through holes 20g, the intermediate ring 20D may be formed with a vertical notch 20h open in the lower end surface of the intermediate ring 20D and a horizontal notch 20k extending from an inner end of the vertical notch 20h. As the result of the above-described construction of the intermediate ring 20D, after the screws 24 threadingly engaged with the screw holes 11d of the heat dissipator 11 have been inserted into the respective vertical notches 20h, the intermediate ring 20D fixed to glove 14 is turned relative to the heat dissipator 11 and the screws 24 are engaged with the horizontal notches 20k, respectively. Thus, the glove 14 can be attached to the heat dissipator 11 by a simple operation.

Figure 8:
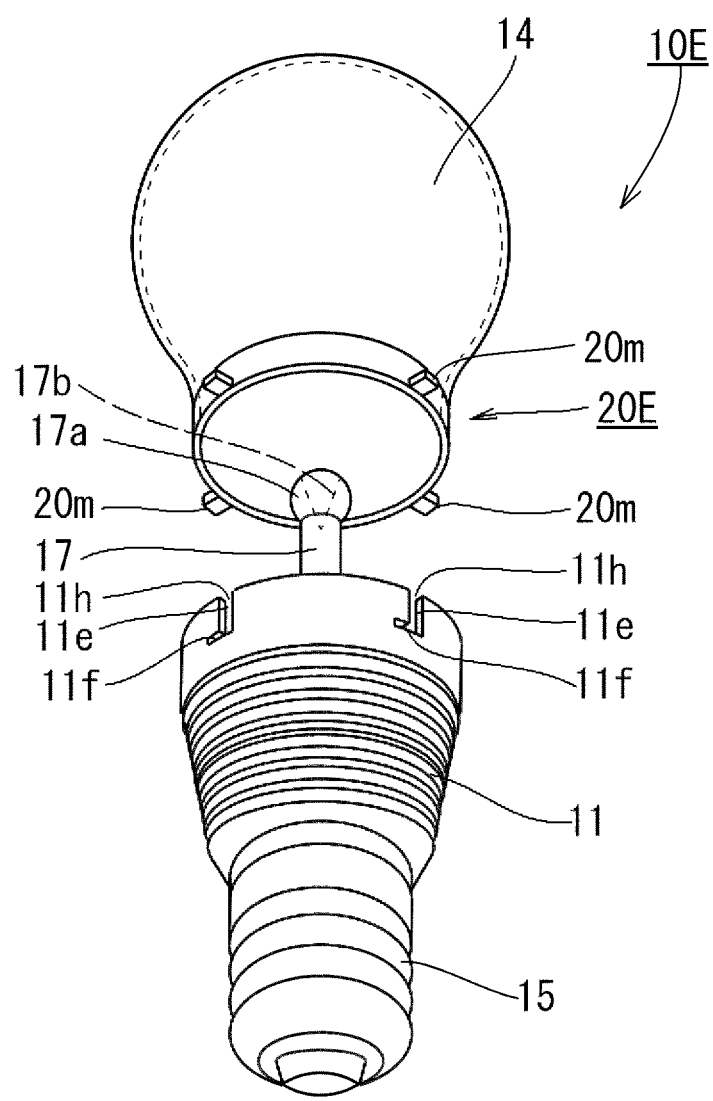
FIG. 8 is an exploded perspective view of an LED lamp of a sixth embodiment.

FIG. 8 illustrates an LED lamp 10E of a sixth embodiment. The intermediate ring 20E of the LED lamp 10E has an outer periphery formed with a plurality of engaging protrusions 20m which protrudes outward. On the other hand, the upper end of the heat dissipator 11 is formed with a plurality of engaging recesses 11h including a vertical notch 11e open in the upper end of heat dissipator 11 and a horizontal notch 11f extending from an inner end of the vertical notch 11e.

The other structure of the LED lamp 10E of the sixth embodiment is identical with that of the LED lamp 10 of the first embodiment. Identical or similar parts in the sixth embodiment are labeled by the same reference symbols as those in the first embodiment and the description of these parts will be eliminated.

According to the LED lamp 10E of the sixth embodiment, the glove 14 can detachably be attached to the heat dissipator 11 by a simple operation of inserting the engaging protrusions 20m into the respective vertical notches 11e and turning the glove 14 relative to the heat dissipater 11 so that the engaging protrusions 20m engage the respective horizontal notches 11f.

In the LED lamp 10E of the sixth embodiment, the engaging protrusions 20m are formed on the intermediate ring 20E and the engaging recesses 11h are formed in the heat dissipator 11. However, the intermediate ring 20E may be formed with the engaging recesses 11h and the heat dissipator 11 may be formed with the engaging protrusions 20m.

Figure 9:
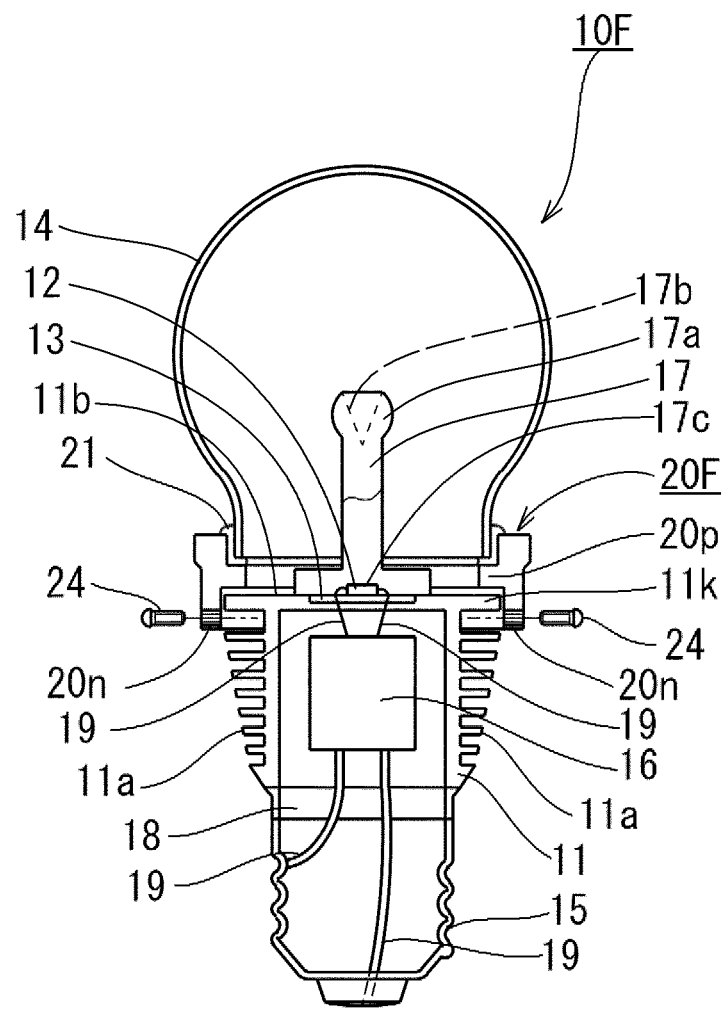
FIG. 9 is a sectional view of an LED lamp of a seventh embodiment.

FIG. 9 illustrates an LED lamp 10F of a seventh embodiment. The intermediate ring 20F has a plurality of through screw holes 20n formed in the end thereof. The intermediate ring 20F also has ring protrusions 20p which are formed on the middle portion thereof so as to protrude inward. The heat dissipator 11 has a flange 11k formed on a middle portion of the end thereof.

The other structure of the LED lamp 10F of the seventh embodiment is identical with that of the LED lamp 10 of the first embodiment. Identical or similar parts in the seventh embodiment are labeled by the same reference symbols as those in the first embodiment and the description of these parts will be eliminated.

According to the LED lamp 10F of the seventh embodiment, the screws 24 are screwed through the screw holes 20n respectively. The flange 11k is held between the screw 24 distal ends protruding from the screw holes 20n and the ring protrusions 20p. Consequently, the glove 14 can detachably be attached to the heat dissipator 11.

Figure 10:
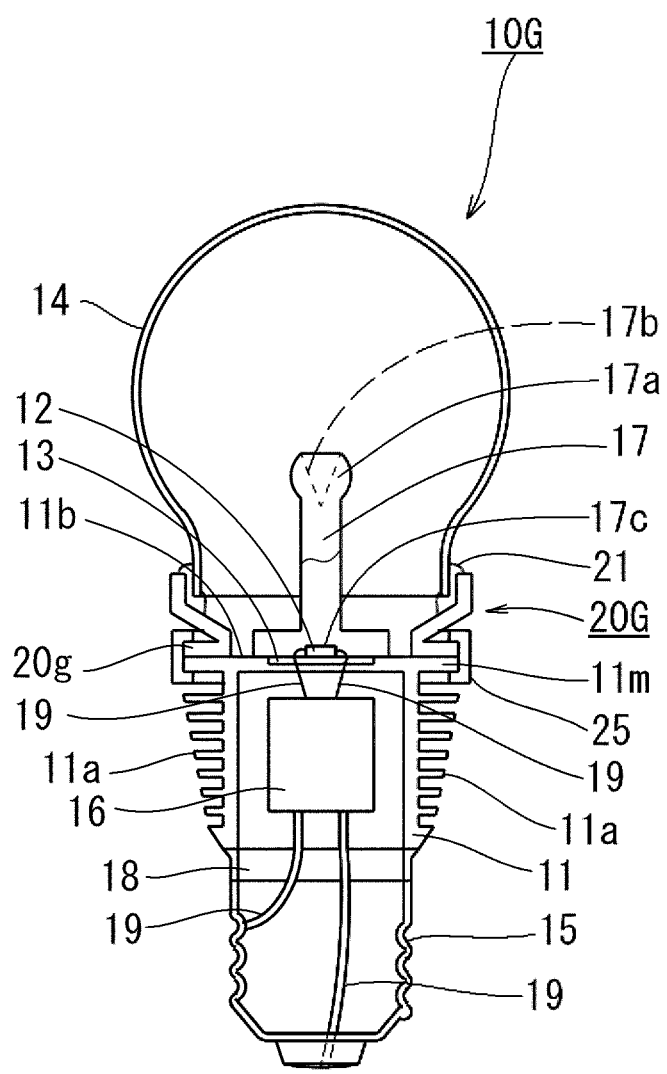
FIG. 10 is a sectional view of an LED lamp of an eighth embodiment.
Figure 11:
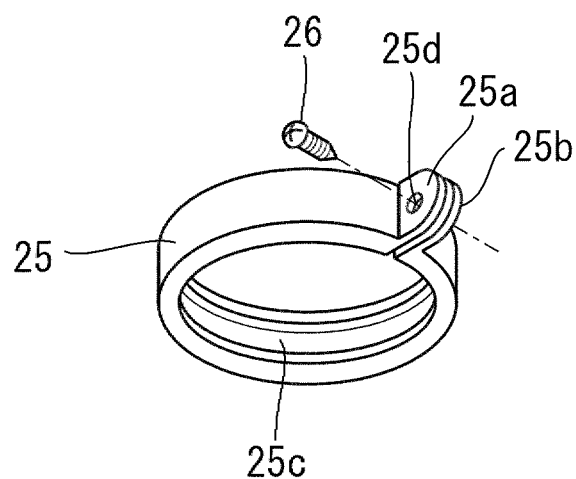
FIG. 11 is a perspective view of a coupling ring of the LED lamp of the eighth embodiment.

FIG. 10 illustrates an LED lamp 10G of an eighth embodiment. The LED lamp 10G includes the intermediate ring 20G and a coupling ring 25. The intermediate ring 20G has ring protrusions 20q which are formed on the outer periphery of the lower end thereof. The coupling ring 25 has two ends formed with bent pieces 25a and 25b respectively as shown in FIG. 11. The coupling ring 25 also has a ring groove 25c formed in the inner periphery thereof. One bent piece 25a has a through hole 25d and the other bent piece 25b has a screw hole (not shown). The upper end of the heat dissipator 11 has a flange 11m formed on the outer periphery thereof.

The other structure of the LED lamp 10G of the eighth embodiment is identical with that of the LED lamp 10 of the first embodiment. Identical or similar parts in the eighth embodiment are labeled by the same reference symbols as those in the first embodiment and the description of these parts will be eliminated.

In the LED lamp 10G of the eighth embodiment, the upper end of the intermediate ring 20G is fixed to the open end of glove 14 by the bonding agent 21. The flange 11m of the heat dissipator 11 and the ring protrusions 20q are overlapped with each other. The coupling ring 25 is wound on the overlapped flange 11m and the ring protrusions 20q, and the flange 11m and the ring protrusions 20q are engaged with the ring groove 25c. The bent piece 25a of the coupling ring 25 is inserted through the hole 25d of the bent piece 25a. A small screw 26 is screwed into the screw hole of the bent piece 25b, whereby both ends of the coupling ring 25 are coupled together. As a result, the glove 14 can be detachably attached to the heat dissipator 11.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:
1. An LED lamp comprising:
a heat dissipator having two ends;
a module substrate which is fixed to one end of the heat dissipator and mounted with an LED chip;
a cap mounted via an insulator on the other end of the heat dissipator;
a lighting circuit which is disposed in the heat dissipator and/or the cap to supply electric power to the LED chip, the lighting circuit being electrically connected to the cap;
a glove made of a translucent material and having an open end which is attached to said one end of the heat dissipator so as to cover the module substrate;
an intermediate ring having two ends and including an engaging portion formed on one end thereof; and
an engaged portion which is formed on said one end of the heat dissipator so as to be detachably engageable with the engaging portion, wherein:
the other end of the intermediate ring is bonded with the open end of the glove thereby to be fixed to the open end of the glove; and the engaging portion of the intermediate ring fixed to the glove engages the engaged portion of said one end of the heat dissipator so that the glove is detachably attached to the heat dissipator.

2. The LED lamp according to claim 1, wherein the engaging portion is a screw thread or a thread groove formed on an outer or inner periphery of the intermediate ring;

the engaged portion is a thread groove or a screw thread formed on said one end of the heat dissipator; and the screw thread or the thread groove of the intermediate ring threadingly engages the thread groove or the screw thread of the heat dissipator so that the glove is detachably attached to the heat dissipator.

3. The LED lamp according to claim 2, further comprising a cylindrical cover made of a synthetic resin and covering the outer periphery of the heat dissipator, wherein the cylindrical cover has an open end formed with an inwardly protruding flange, and the flange is held between the intermediate ring threadingly engaging the said one end of the heat dissipator and said one end surface of the heat dissipator, whereby the cylindrical cover is attached to the heat dissipator.

4. The LED lamp according to claim 2, wherein the intermediate ring has a screw hole into which a setscrew is screwed, and the setscrew has a distal end pressed against an outer periphery of the said one end of the heat dissipator.

5. The LED lamp according to claim 1, wherein said one end of the intermediate ring is formed with a through hole;

the engaging portion is a screw inserted through the hole of the intermediate ring;

the engaged portion is a screw hole formed in an outer periphery of said one end of the heat dissipator; and the screw inserted through the hole of the intermediate ring is further screwed into the screw hole of the heat dissipator, whereby the glove is detachably attached to the heat dissipator.

6. The LED lamp according to claim 1, wherein the engaging portion is a plurality of engaging protrusions which is formed on the outer periphery of the intermediate ring so as to protrude outward;

the engaged portion is a plurality of engaged recesses including pairs of vertical notches open at said one end of the heat dissipator and horizontal notches extending from inner ends of the vertical notches, respectively; and the engaging protrusions are inserted into the vertical notches and thereafter, the glove is turned relative to the heat dissipator so that the engaging protrusions engage the horizontal notches, whereby the glove is detachably attached to the heat dissipator, respectively.

7. The LED lamp according to claim 1, wherein the engaging portion is a plurality of engaging recesses including pairs of vertical notches open at an end of the intermediate ring and horizontal notches extending from inner ends of the vertical notches, respectively;

the engaged portion is a plurality of engaged protrusions which is formed on said one end outer periphery of the heat dissipator so as to protrude outward; and the engaged protrusions are inserted into the vertical notches and thereafter, the glove is turned relative to the heat dissipator so that the engaged protrusions are engaged with the horizontal notches, whereby the glove is detachably attached to the heat dissipator, respectively.

8. The LED lamp according to claim 1, wherein the engaging portion includes a plurality of through holes formed through the end of the intermediate ring and screws screwed through the holes respectively and ring protrusions which are formed on a middle part of the intermediate ring so as to protrude inward;

the engaged portion includes a flange formed on the outer periphery of said one end of the heat dissipator; and the flange is held between the ring protrusions and distal ends of the screws protruding from the holes of the intermediate ring, whereby the globe is detachably attached to the heat dissipator.

9. An LED lamp comprising:

a heat dissipator having two ends;

a module substrate which is fixed to one end of the heat dissipator and mounted with an LED chip;

a cap mounted via an insulator on the other end of the heat dissipator;

a lighting circuit which is disposed in the heat dissipator and/or the cap to supply electric power to the LED chip, the lighting circuit being electrically connected to the cap;

a glove made of a translucent material and having an open end which is attached to said one end of the heat dissipator so as to cover the module substrate;

an intermediate ring having two ends and including ring protrusions formed on an outer periphery of one end thereof; and a coupling ring having two ends releasably connectable to each other and having an inner periphery formed with a ring groove, wherein:

the heat dissipator has a flange formed on an outer periphery of said one end thereof;

the other end of the intermediate ring is bonded to the open end of the glove thereby to be fixed to the open end of the glove;

the flange of the heat dissipator and the ring protrusions of the intermediate ring are overlapped;

the coupling ring is wound on the overlapped flange and ring protrusions so that the flange and the ring protrusions are engaged in the ring groove; and the ends of the coupling ring are connected together, whereby the glove is detachably attached to the heat dissipator.

* * * * *